(12) United States Patent
Lewis et al.

(10) Patent No.: US 10,356,466 B1
(45) Date of Patent: Jul. 16, 2019

(54) PROVIDING SELECTABLE CONTENT CREATOR CONTROLS IN CONJUNCTION WITH SPONSORED MEDIA CONTENT ITEMS

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/464,163

(22) Filed: Mar. 20, 2017

Related U.S. Application Data

(63) Continuation of application No. 14/179,620, filed on Feb. 13, 2014, now Pat. No. 9,602,566.

(51) Int. Cl.
*H04L 29/08* (2006.01)
*H04N 21/431* (2011.01)
(Continued)

(52) U.S. Cl.
CPC ........ *H04N 21/4316* (2013.01); *H04L 67/20* (2013.01); *H04N 21/4438* (2013.01); *H04N 21/8545* (2013.01)

(58) Field of Classification Search
CPC ............ H04N 21/4316; H04N 21/8545; H04L 67/20; H04L 21/4438
(Continued)

(56) References Cited

U.S. PATENT DOCUMENTS 7,792,698 B1 9/2010 Veach et al.
2004/0267806 A1 12/2004 Lester
(Continued)

OTHER PUBLICATIONS

Haydon, "how to add a subscribe button to a YouTube video", retrieved from a web blog, http://www.socialbrite.org/2012/05/10/how-to-add-subscribe-button-to-a-youtube-video/, May 2012.*
(Continued)

*Primary Examiner* — Nicholas R Taylor
*Assistant Examiner* — Chong G Kim
(74) *Attorney, Agent, or Firm* — Lowenstein Sandler LLP

(57) ABSTRACT

Systems and methods are disclosed for providing selectable content creator controls in conjunction with sponsored media content items. A method includes receiving a media content item of a first user of a content sharing platform, wherein the media content item reflects a positive review of a product of a second user of the content sharing platform, and providing the media content item of the first user for presentation to the second user. The method further includes receiving a selection of the media content item by the second user, the selection of the media content item indicating a request of the second user to sponsor a presentation of the media items to users of the content sharing platform to promote the product of the second user, creating a media player interface comprising the media content item and a control selectable to view information promoting additional media content items of the first user, and providing the media player interface for presentation to a third user of the content sharing platform.

22 Claims, 7 Drawing Sheets

(51) Int. Cl.
*H04N 21/443* (2011.01)
*H04N 21/8545* (2011.01)

(58) Field of Classification Search
USPC .......................................................... 709/219
See application file for complete search history.

(56) References Cited

U.S. PATENT DOCUMENTS

| | | | |
|---|---|---|---|
| 2007/0157228 A1 | 7/2007 | Bayer et al. | |
| 2008/0066107 A1* | 3/2008 | Moonka | G06F 17/30796 725/42 |
| 2008/0275763 A1 | 11/2008 | Tran et al. | |
| 2008/0276272 A1 | 11/2008 | Rajaraman et al. | |
| 2008/0295129 A1 | 11/2008 | Laut | |
| 2009/0006191 A1* | 1/2009 | Arankalle | G06Q 30/02 705/14.71 |
| 2009/0150210 A1* | 6/2009 | Athsani | G06Q 30/00 705/7.29 |
| 2010/0010893 A1* | 1/2010 | Rajaraman | G06Q 30/0253 705/14.51 |
| 2010/0122286 A1 | 5/2010 | Begeja et al. | |
| 2010/0131355 A1 | 5/2010 | Kitchen et al. | |
| 2011/0231260 A1* | 9/2011 | Price | G06Q 30/02 705/14.61 |
| 2011/0321072 A1* | 12/2011 | Patterson | H04N 21/44222 725/5 |
| 2012/0016724 A1 | 1/2012 | Harrison et al. | |
| 2012/0072278 A1 | 3/2012 | Kamangar et al. | |
| 2013/0047076 A1 | 2/2013 | McElfresh et al. | |
| 2013/0086607 A1 | 4/2013 | Tom et al. | |
| 2013/0151352 A1* | 6/2013 | Tsai | G06Q 30/0641 705/14.73 |
| 2013/0283307 A1* | 10/2013 | Avedissian | G06Q 30/0214 725/23 |
| 2013/0304587 A1 | 11/2013 | Ralston | |
| 2014/0150029 A1* | 5/2014 | Avedissian | G06Q 30/0261 725/60 |
| 2014/0164144 A1* | 6/2014 | Belyaev | G06Q 30/0275 705/14.71 |
| 2014/0188611 A1 | 7/2014 | Wu et al. | |
| 2014/0244660 A1 | 8/2014 | Lewis et al. | |
| 2014/0245183 A1* | 8/2014 | Lewis | G06F 3/04842 715/753 |
| 2014/0359656 A1* | 12/2014 | Banica | H04N 21/812 725/32 |
| 2015/0121418 A1 | 4/2015 | Jain et al. | |
| 2015/0199727 A1* | 7/2015 | Naveh | G06Q 30/0269 705/14.66 |
| 2015/0206169 A1 | 7/2015 | Ye et al. | |

OTHER PUBLICATIONS

Amit Agarwal, "YouTube Publishers Can Embed Links to External Websites in Videos," retrieved from a web blog (http://www.labnol.org/internet/youtube-links-to-external-sites/26209/), Dec. 2012.

Haydon, "How to add a subscribe button to a YouTube video," retrieved from a web blog http://www.socialbrite.org/2012/05/10/how-to-add-subscribe-button-to-a-youtube-video/, May 10, 2012.

* cited by examiner

PROVIDING SELECTABLE CONTENT CREATOR CONTROLS IN CONJUNCTION WITH SPONSORED MEDIA CONTENT ITEMS

CROSS-REFERENCE TO RELATED APPLICATION

This application is a continuation of U.S. Non-Provisional patent application Ser. No. 14/179,620 filed on Feb. 13, 2014, entitled "PROVIDING SELECTABLE CONTENT CREATOR CONTROLS IN CONJUCTION WITH SPONSORED MEDIA CONTENT ITEMS" which is incorporated herein by reference.

TECHNICAL FIELD

Aspects and implementations of the present disclosure relate to data processing, and more specifically, to providing selectable content creator controls in conjunction with sponsored media content items.

BACKGROUND

Audio and video content can be stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a media content item of a content creator. The processing device provides the media content item to a content viewer based on a selection of the media content item by a content sponsor. The processing device provides, to the content viewer and in relation to the media content item, a first control, the first control being associated with the content sponsor. The processing device provides, to the content viewer and in relation to the media content item, a second control, the second control being associated with the content creator In another aspect, a processing device receives a media content item. The processing device receives a first control in conjunction with the media content item, the first control being associated with a content sponsor of the media content item. The processing device receives a second control in conjunction with the media content item, the second control being associated with a content creator of the media content item.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to providing selectable content creator controls in conjunction with sponsored media content items. The systems and methods disclosed can be applied to media content such as audio and/or video content, images, and/or any other content that can be collected and/or disseminated such as via a media sharing service or website. More particularly, many content sponsors (e.g., advertisers) utilize media content items (e.g., videos) created/generated by others (e.g., content creators) as sponsored content. For example, a content sponsor wishing to promote a particular product (e.g., via video ads which may, for example, be presented to viewers/users of a media sharing service before and/or during a pause in other videos that such viewers have selected to view) may select videos showing reviews, demos, etc., of such a product. It can be appreciated that such 'third party' content (in that such content was created by a party other than the content sponsor) may be recognized by some users as being more objective and/or trustworthy (e.g., as compared to content created by the content sponsors themselves). However, while such scenarios can be advantageous for the content sponsor (as the sponsor is able to disseminate sponsored content that was created by other users and thus may be more effective in conveying an intended message), the creators of such sponsored content often do not reap the benefits of such exposure (beyond compensation that the sponsor may provide).

Accordingly, described herein in various embodiments are technologies that enable providing selectable content creator controls in conjunction with sponsored media content items. For example, having received a selection from a content sponsor of a media content item provided by a content creator (indicating that such a media content item is to be provided as sponsored content to one or more content viewers), such a media content item can be provided (e.g., to one or more content viewers) together with one or more controls (which can be, for example, user interface elements overlaid upon the interface (e.g., a media player window) of the media content item and/or adjacent thereto). Such controls can enable the content viewer not only to learn/discover more about the content sponsor, but also about the content creator. Additionally, in certain implementations such control(s) can enable the content viewer to initiate one or more operations (e.g., generate a subscription to additional content provided by the content creator, etc.). In doing so, in addition to promoting the subject matter intended by the content sponsor, the content creator can also receive a degree of exposure, as described herein.

Figure 1:
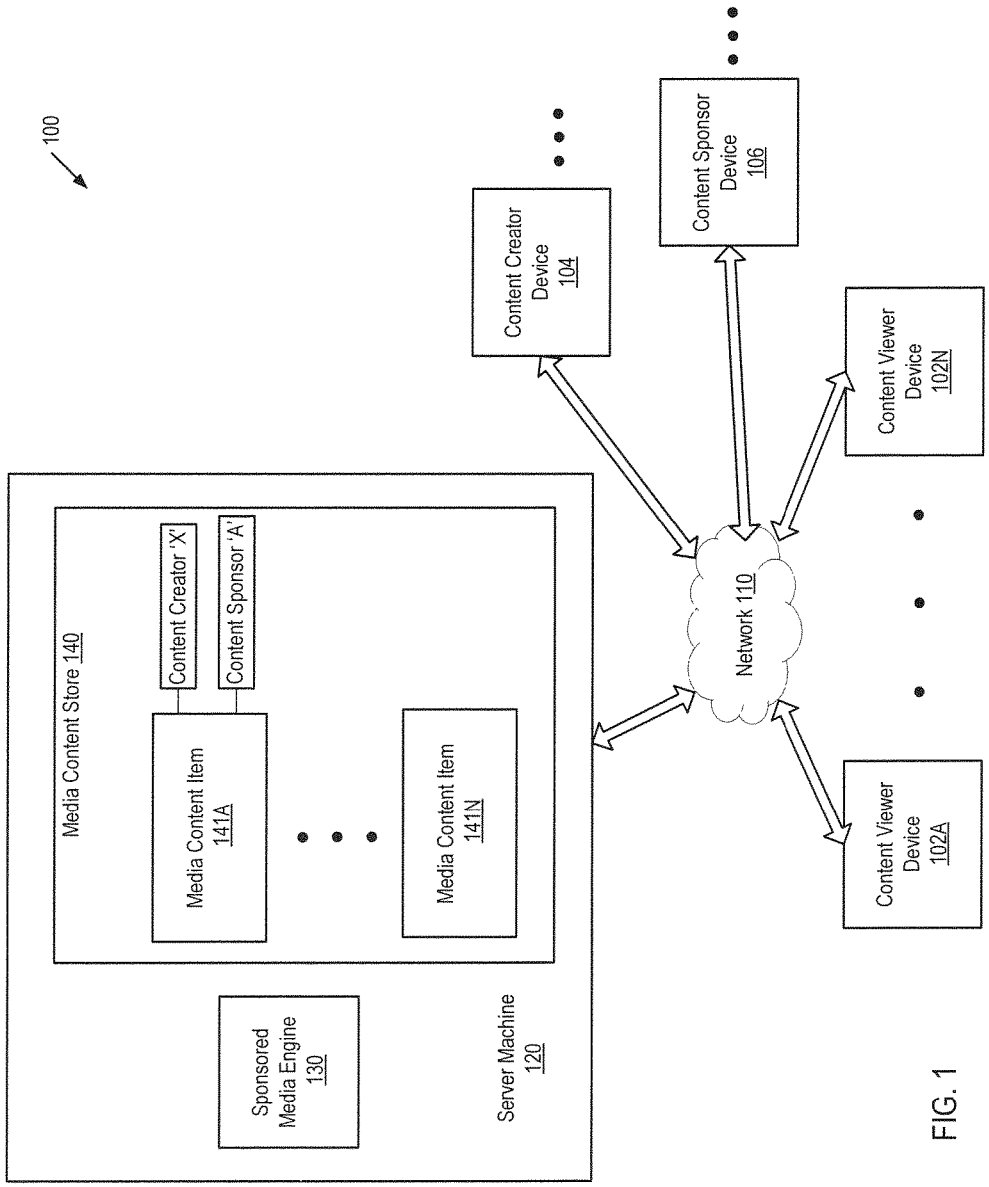
FIG. 1 depicts an illustrative system architecture, in accordance with one implementation of the present disclosure.

FIG. 1 depicts an illustrative system architecture 100, in accordance with one implementation of the present disclosure. The system architecture 100 includes content viewer devices 102A-102N, content creator device(s) 104, content sponsor device(s) 106 and server machine 120. These various elements or components can be connected to one another via network 110, which can be a public network (e.g., the Internet), a private network (e.g., a local area network (LAN) or wide area network (WAN)), or a combination thereof.

Content viewer devices 102A-102N can be wireless terminals (e.g., smartphones, etc.), personal computers (PC), laptops, tablet computers, or any other computing or communication devices. The content viewer devices 102A-102N may run an operating system (OS) that manages hardware and software of the content viewer devices 102A-102N. Various applications, such as mobile applications ('apps'), web browsers, etc. (not shown) may run on the client machines (e.g., on the OS of the client machines). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the user device 102. The content viewer devices 102A-102N can be geographically distributed anywhere throughout the world. In various implementations (such as are described herein), content viewer devices 102 can be engaged in viewing/receiving media content items 141 (e.g., streaming video content) from server machine 120. Such devices 102 can provide/present such media content to one or more users (e.g., via a dedicated application, a media player embedded in a webpage viewed in a web browser, etc.).

Content creator device(s) 104 can be wireless terminals (e.g., smartphones, etc.), personal computers (PC), laptops, tablet computers, or any other computing or communication devices. The content creator device(s) 104 may run an operating system (OS) that manages hardware and software of the content creator device(s) 104. Various applications, such as mobile applications ('apps'), web browsers, etc. (not shown) may run on the client machines (e.g., on the OS of the client machines). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content creator device(s) 104. The content creator device(s) 104 can be geographically distributed anywhere throughout the world. In various implementations (such as are described herein), content creator device(s) 104 can be engaged in creating and/or generating, media content items 141 (e.g., video content) and/or providing such content to server machine 120. The media content items provided by such content creator device(s) 104 can then be selected by other users for viewing (e.g., via content viewer devices 102). Additionally, such media content items can be selected by third parties such as content sponsors to be presented to content viewers, such as in a manner described herein.

Content sponsor device(s) 106 can be wireless terminals (e.g., smartphones, etc.), personal computers (PC), laptops, tablet computers, or any other computing or communication devices. The content sponsor device(s) 106 may run an operating system (OS) that manages hardware and software of the content sponsor device(s) 106. Various applications, such as mobile applications ('apps'), web browsers, etc. (not shown) may run on the client machines (e.g., on the OS of the client machines). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content sponsor device(s) 106. The content sponsor device(s) 106 can be geographically distributed anywhere throughout the world. In various implementations (such as are described herein), content sponsor device(s) 106 can be engaged in selecting media content items 141 (e.g., video content) from server machine 120 (such as those provided by content creator device(s) 104). The media content items selected by content sponsor device(s) 106 (such as those media content items provided by content creator device(s) 104) can then be provided to other users (e.g., content viewer devices 102) as sponsored content (e.g., prior to and/or during a pause in another media content item selected by the content viewer), such as in a manner described herein. For example, a content sponsor wishing to promote a particular product can select a video review of the product created by a content creator, and such a video review can be provided as sponsored content to a content viewer.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as sponsored media engine 130 and media content store 140. The components can be combined together or separated in further components, according to a particular implementation. It should be noted that in some implementations, various components of server machine 120 may run on separate machines (e.g., on one or more of content viewer devices 102, content creator devices 104 and/or content sponsor devices 106). Moreover, some operations of certain of the components are described in more detail below with respect to FIG. 2.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Media content store 140 can include media content items 141A-141N. In certain implementations, media content items 141A-141N can correspond to media content itself (e.g., audio clips, video clips, images, etc.) and can be provided, for example, by a media content provider (e.g., content creator device 104). Such media content items can also be associated with metadata indicating such a provider (e.g., 'Content Creator 'X"). Additionally, in certain implementations media content items 141A-141N can be selected by one or more content sponsors (e.g., via content sponsor device 106). Such media content items can also be associated with metadata indicating such a sponsor (e.g., 'Content Sponsor 'A"). By sponsoring such a media content item, the content sponsor can, for example, agree to provide compensation to the creator of the content and/or to the media sharing service in return for providing such a media content item to one or more content viewers. In doing so, the content sponsor can facilitate and increase exposure to the subject matter reflected in the sponsored media content item. As noted, in various implementations such media content item(s) can be presented via one or more webpages and/or applications provided by the media sharing service and/or via one or more embedded media viewers that can be incorporated within other webpages and/or applications.

As described herein, having received a selection from a content sponsor of a media content item provided by a content creator (indicating that such a media content item is to be provided as sponsored content to one or more content viewers), such a media content item can be provided (e.g., to such content viewers). Additionally, one or more controls can be provided in conjunction with such a sponsored media content item (e.g., overlaid upon the interface of the media content item and/or adjacent thereto). Such controls can, for example, enable the content viewer to learn/discover more about the content sponsor and/or the content creator. Additionally, in certain implementations such control(s) can enable the content viewer to initiate one or more operations (e.g., generate a subscription to additional content provided by the content creator, etc.). In doing so, concurrent with promoting the subject matter intended by the content sponsor (by displaying the sponsored media content item to the content viewer), exposure can also be provided to the content creator that created the sponsored content, as described herein.

Figure 2:
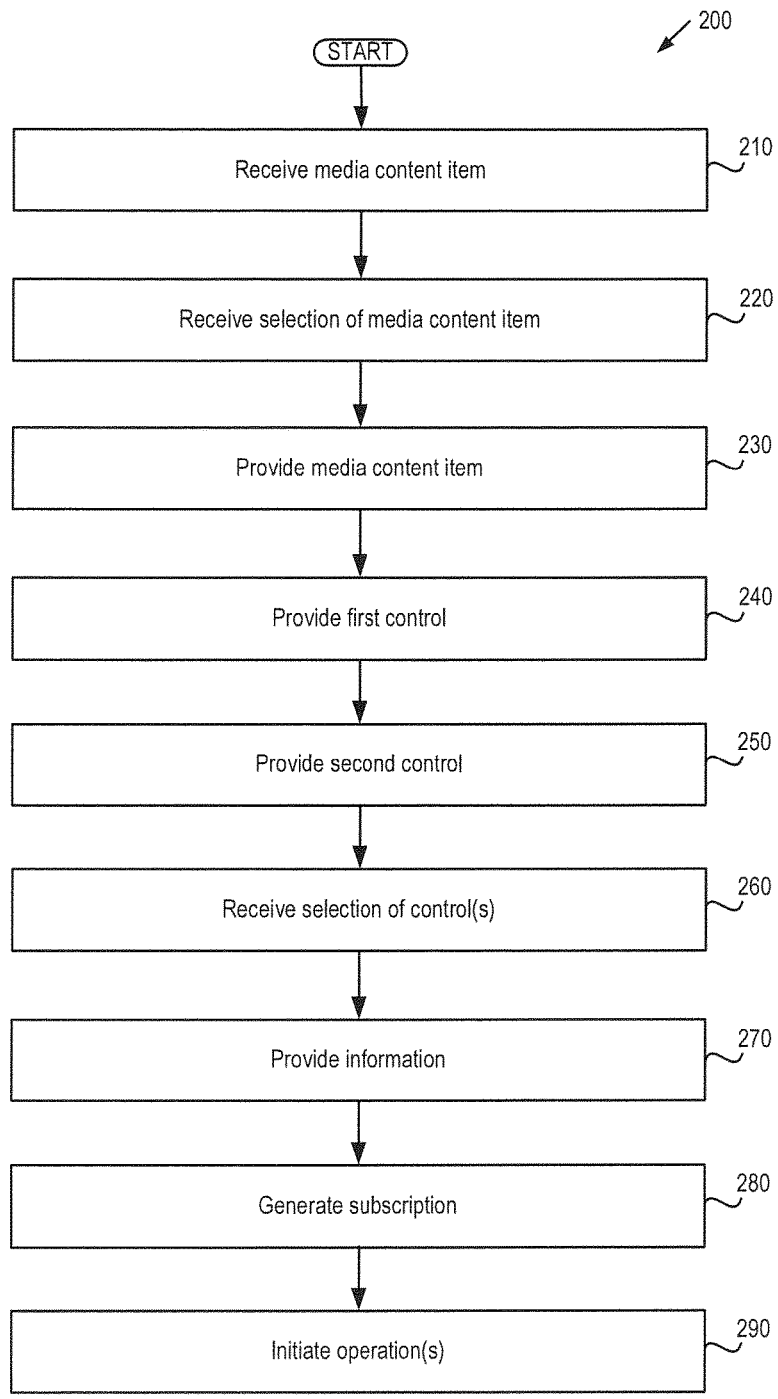
FIG. 2 depicts a flow diagram of aspects of a method for providing selectable content creator controls in conjunction with sponsored media content items.

FIG. 2 depicts a flow diagram of aspects of a method 200 for providing selectable content creator controls in conjunction with sponsored media content items. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations, one or more blocks of FIG. 2 may be performed by another machine. For example, in various alternative implementations, the method can be performed at one or more of content viewer device 102, content creator device 104 and/or content sponsor device 106 (i.e., the method or various aspects thereof can be performed locally at the respective device(s) 102, 104, 106 rather than in communication with a server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, a media content item can be received. In certain implementations, such a media content item can be generated and/or provided by a content creator (e.g., via content creator device 104 as depicted in FIG. 1). For example, as described herein, a content creator can be an individual and/or entity that creates media content (e.g., videos) and provides/submits such content to a media sharing system/service (e.g., server machine 120 as depicted in FIG. 1). In submitting media content items to such a media sharing service, such media content items can be accessed/viewed by other users of the service (e.g., via content viewer devices 102). In one aspect, block 210 is performed by sponsored media engine 130.

At block 220, a selection of a media content item (such as the media content item received at block 210) can be received. In certain implementations, such a selection can be provided by and/or received from a content sponsor (e.g., via content sponsor device 106 as depicted in FIG. 1). That is, having received media content item(s) from a content creator (e.g., at block 210), such media content items 141 can be made available to content sponsors 104 for selection (e.g., via an 'opt-in' selection provided by the content creator, indicating that one or more media content items provided by the content creator may be made available to content sponsors to utilize in sponsored presentations of such content items). For example, a content sponsor (e.g., an advertiser) seeking to promote a particular product can provide a selection of one or more media content items that pertain to such a product (e.g., video reviews and/or demonstrations of such a product created and submitted to the media sharing service by a content creator 104). In one aspect, block 220 is performed by sponsored media engine 130.

At block 230, a media content item (such as the media content item received at block 210 and/or selected at block 220) can be provided. In certain implementations, such a media content item can be provided to a content viewer (e.g., via one of content viewer devices 102). Moreover, in certain implementations, such a media content item can be provided based on a selection of the media content item by a content sponsor (e.g., at block 220). That is, it can be appreciated that in addition to providing media content items to users (e.g., content viewers) in response to a selection of such users, in certain scenarios various media content items can be provided to users based on selections originating from other parties (e.g., content sponsors). For example, at various intervals (e.g., before the presentation of a media content item selected by the content viewer, during a pause in presentation of a media content item selected by the content viewer, etc.) a content viewer can be provided/presented with media content items that are sponsored/promoted by another entity (e.g., a content sponsor). It should be understood that such sponsored media content items can be presented to such content viewers based on a selection by a content sponsor and/or based on any number of criteria (e.g., the relevance of the sponsored content to the media content item selected by the content viewer, etc.). In one aspect, block 230 is performed by sponsored media engine 130.

At block 240, a first control can be provided. In certain implementations, such a control can be provided to the content viewer (e.g., via content viewer device 102A). Moreover, in certain implementations, such a control can be provided in relation to a media content item (such as the media content item provided at block 230). Additionally, in certain implementations, such a control can be associated with a content sponsor (such as the content sponsor that selected the media content item, e.g., at block 220). That is, it can be appreciated that a content viewer who is viewing a media content item sponsored/promoted by a content sponsor may be interested to learn/discover more about the subject of the sponsored media content item (e.g., a product featured in the video). Accordingly, one or more controls (e.g., a selectable region of the interface of the media player presented to the user, one or more buttons or controls presented adjacent to the media player, etc.) can be generated and provided in relation to the presentation of the sponsored media content item. Such control(s) can, for example, incorporate a link to a website, social networking profile/page, landing page, etc., that is associated with the content sponsor. In doing so, a user that selects such a control can learn/discover more about the content sponsor and/or initiate additional interaction(s) with the content sponsor. In one aspect, block 240 is performed by sponsored media engine 130.

Figure 3A:
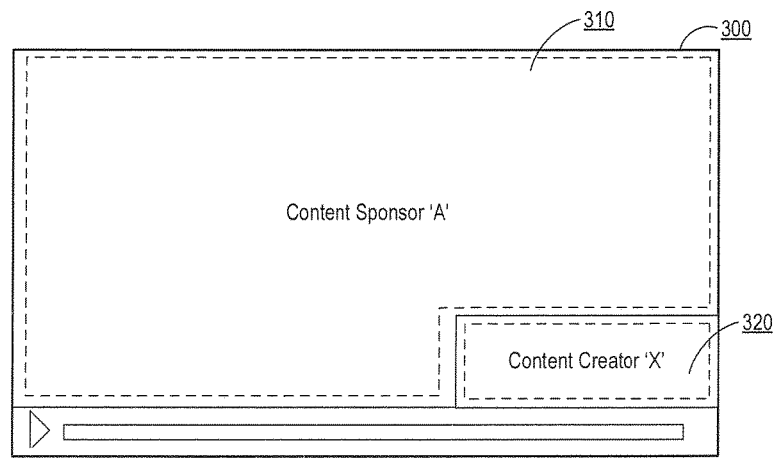
FIG. 3A depicts an exemplary media player interface within which a media content item is provided, in accordance with one implementation of the present disclosure.

By way of illustration, FIG. 3A depicts an exemplary media player interface 300 within which a media content item 141 (e.g., a media content item created by 'Content Creator 'X'' and sponsored by 'Content Sponsor 'A'') is provided (e.g., to a content viewer). As noted, such an interface can incorporate a control 310, such as a selectable/interactive region of the media player interface (as indicated by the dashed line surrounding the region indicated as 'Content Sponsor 'A'' in FIG. 3A) that can be associated with the content sponsor. Accordingly, in various implementations such a control can be configured to incorporate a link (e.g., to a website, social networking profile, etc.) associated with the content sponsor, such that such a link is activated upon receiving a selection (e.g., from a content viewer) within the indicated region.

Figure 3B:
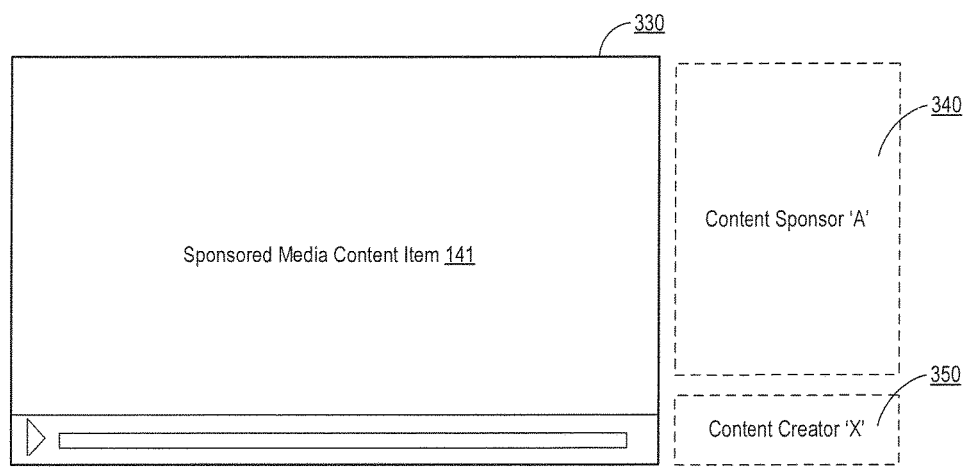
FIG. 3B depicts an exemplary media player interface within which a media content item is provided, in accordance with one implementation of the present disclosure.

By way of further illustration, FIG. 3B depicts an exemplary media player interface 330 within which a sponsored media content item 141 (e.g., as sponsored by 'Content Sponsor 'A'') is provided (e.g., to a content viewer). In this scenario, a control 340 (e.g., a selectable/interactive region such as is indicated by the dashed line surrounding the region indicated as 'Content Sponsor 'A'' in FIG. 3B) associated with the content sponsor can be incorporated adjacent to of the media player interface 330. As noted, in various implementations such a control can be configured to incorporate a link (e.g., to a website, social networking profile, etc.) associated with the content sponsor, such that such a link is activated upon receiving a selection (e.g., from a content viewer) within the indicated region.

At block 250, a second control can be provided. In certain implementations, such a control can be provided to a content viewer (e.g., the content viewer to which the media content item was provided at block 230). Moreover, in certain implementations, such a control can be provided in relation to a media content item (such as the media content item provided at block 230). Additionally, in certain implementations, such a control can be associated with a content creator (such as the content creator that generated the media content item, e.g., as received at block 210). That is, in addition to providing a control associated with the content sponsor, another control that is associated with the content creator can also be provided. Such a control can, for example, enable the content viewer who is viewing a sponsored media content item to learn/discover more about the creator of the media content item. Accordingly, one or more controls (e.g., a selectable region of the interface of the media player presented to the user, one or more buttons or controls presented adjacent to the viewer, etc.) can be generated and provided in relation to the presentation of the sponsored media content item. Such control(s), for example, can incorporate a link to a website, social networking profile/page, landing page, etc., that is associated with the content creator. In doing so, a user that selects such a control can learn/discover more about the content creator and/or initiate additional interaction(s) with the content creator. In one aspect, block 250 is performed by sponsored media engine 130.

By way of illustration, as depicted in FIG. 3A (showing an exemplary media player interface 300 within which a media content item created by 'Content Creator 'X'' and sponsored by 'Content Sponsor 'A'' is provided) a control 320 associated with the content creator, such as a selectable/interactive region of the media player interface, can be provided (as indicated by the dashed line surrounding the region indicated as 'Content Creator 'X'' in FIG. 3A). As depicted in FIG. 3A, in certain implementations such a control 320 can encompass a region separate from that encompassed by control 310 (which corresponds to the content sponsor). Additionally, in various implementations such a control can be configured to incorporate a link (e.g., to a website, social networking profile, etc.) associated with the content creator, such that such a link is activated upon receiving a selection (e.g., from a content viewer) within the indicated region. By way of further illustration, as depicted in FIG. 3B, a control 350 (e.g., a selectable/interactive region such as is indicated by the dashed line surrounding the region indicated as 'Content Creator 'X'' in FIG. 3B) associated with the content creator can be incorporated adjacent to of the media player interface 330. As noted, such a control can be configured to incorporate a link (e.g., to a website, social networking profile, etc.) associated with the content creator, such that such a link is activated upon receiving a selection (e.g., from a content viewer) within the indicated region.

In certain implementations, a relative prominence of a control (e.g., a control associated with a content creator) can be increased. That is, it can be appreciated that exposure to the content viewer (e.g., by way of the referenced respective controls) can be valuable to both the content sponsor (by virtue of enabling the content viewer to access/discover additional content regarding the sponsor) and the content creator (by virtue of enabling the content viewer to access/discover additional content regarding the creator). Accordingly, in an attempt to balance the respective interests of both the content sponsor and the content creator, in certain implementations the relative prominence of the respective controls associated with the sponsor/creator can be adjusted (e.g., increased, decreased, eliminated, etc.), such as in relation to the compensation arrangement established between the content sponsor and the content creator (through which the content sponsor compensates the content creator for the right to provide the media content item to content viewers as sponsored content). For example, based on a selection received from the content creator to receive relatively less compensation from the content sponsor in return for providing the media content item. Additionally, in certain implementations a relative prominence of a control (e.g., a control associated with a content creator) can be decreased, such as based on a selection received from the content creator to receive relatively more compensation from the content sponsor in return for providing the media content item.

Figure 4A:
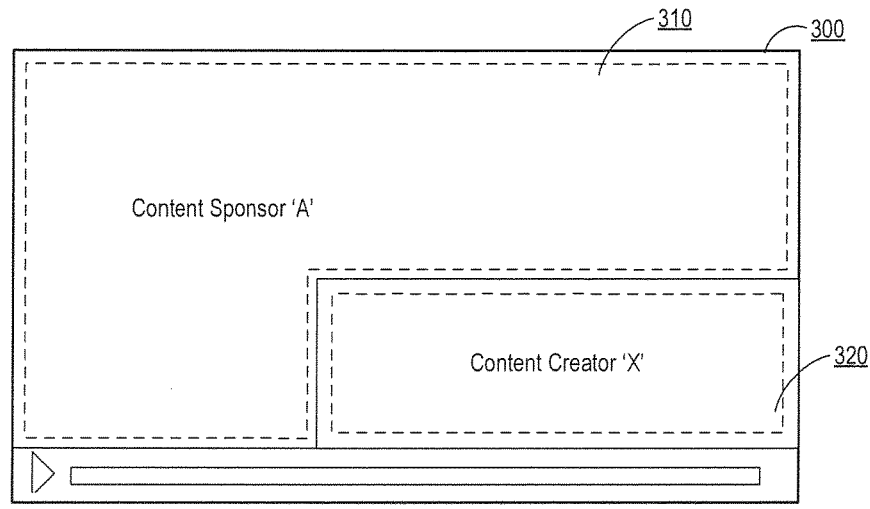
FIG. 4A depicts an exemplary media player interface within which a media content item is provided, in accordance with one implementation of the present disclosure.
Figure 4B:
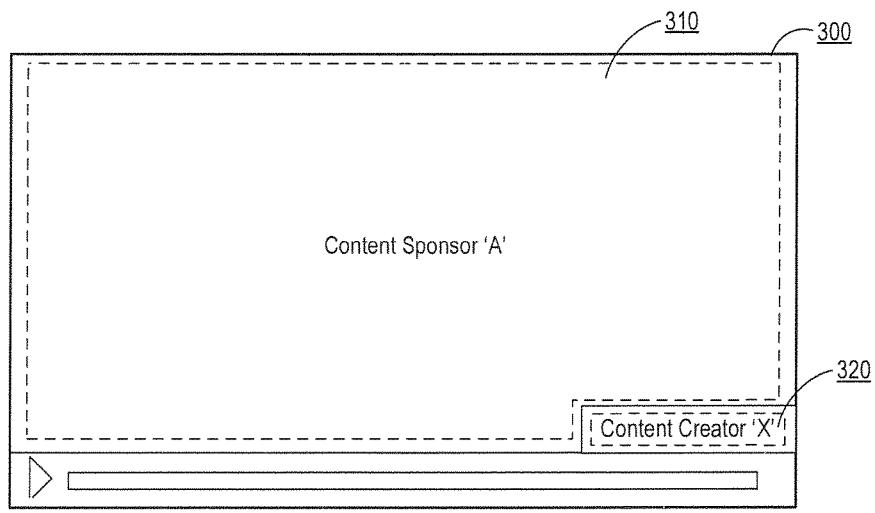
FIG. 4B depicts an exemplary media player interface within which a media content item is provided, in accordance with one implementation of the present disclosure.

By way of illustration, FIG. 4A depicts an exemplary media player interface 300 within which a media content item 141 (e.g., a media content item created by 'Content Creator 'X'' and sponsored by 'Content Sponsor 'A'') is provided (e.g., to a content viewer), such as in a manner substantially comparable to that depicted in FIG. 3A and described herein. However, it can be appreciated with reference to FIG. 4A that the control 310 associated with Content Sponsor 'A' is relatively smaller (as compared to control 310 as depicted in FIG. 3A) while the control 320 associated with Content Creator 'X' is relatively larger (as compared to control 320 as depicted in FIG. 3A). Such a scenario can reflect, for example, that the content sponsor has chosen to provide relatively less compensation to the content creator and/or the content creator has chosen to received relatively less compensation from the content sponsor in return for increasing the relative prominence (e.g., the size) of the control (e.g., control 320) associated with the content creator. It can be appreciated that, in doing so, the content creator can receive additional exposure (e.g., to one or more content viewers) in lieu of receiving relatively more compensation from the content sponsor. By way of further illustration, FIG. 4B depicts an exemplary scenario in which, for example, the content sponsor has chosen to provide relatively more compensation to the content creator and/or the content creator has chosen to received relatively more compensation from the content sponsor in return for decreasing the relative prominence (e.g., the size) of the control (e.g., control 320) associated with the content creator (or, alternatively, eliminating control 320 entirely and thus providing no attribution or exposure to the content creator). It can be appreciated that, in doing so, control 310 associated with Content Sponsor 'A' is relatively larger (as compared to control 310 as depicted in FIG. 3A) while control 320 associated with Content Creator 'X' is relatively smaller (as compared to control 320 as depicted in FIG. 3A). In such a scenario, the content creator can receive relatively less exposure (e.g., to one or more content viewers) in exchange for receiving relatively more compensation from the content sponsor.

It should be noted that in certain implementations the second control (e.g., the control associated with a content creator, such as control 320 as depicted in FIGS. 3A-4B) can include a subscription control (e.g., a control that, when selected by a content viewer, initiates a subscription for the content viewer to updates regarding subsequent media content items created by the content creator). For example, such a subscription control, when selected by a content viewer, can initiate a subscription for the content viewer to one or more channels associated with the content creator (it should be understood that such channels can include, but are not limited to, one or more content pages, feeds, streams, etc., that are associated with, contain and/or are updated with content items associated with the content creator). Accordingly, upon receiving a selection of such a subscription control a subscription can be generated (e.g., with respect to media content items generated by the content creator) (e.g., as described in relation to block 280).

Moreover, in certain implementations the second control (e.g., the control associated with a content creator, such as control 320 as depicted in FIGS. 3A-4B) can include a third-party platform control (e.g., a control that, when selected, initiates one or more operations with respect to a social networking platform, e.g., sharing or disseminating the content within the social networking platform, indicating approval of the content within the social networking platform, etc.). Accordingly, upon receiving a selection of such a third-party platform control, one or more operations can be initiated in relation to a third-party platform (e.g., a social networking platform) such as with respect to the content creator (e.g., as described in relation to block 290).

At block 260, a selection of the first control and/or the second control can be received. In certain implementations, such a selection can be received from the content viewer. For example, a content viewer can select, click, etc., (e.g., via devices 102) on a control associated with the content creator and/or the content provider, and such a selection can be received. In one aspect, block 260 is performed by sponsored media engine 130.

Figure 5:
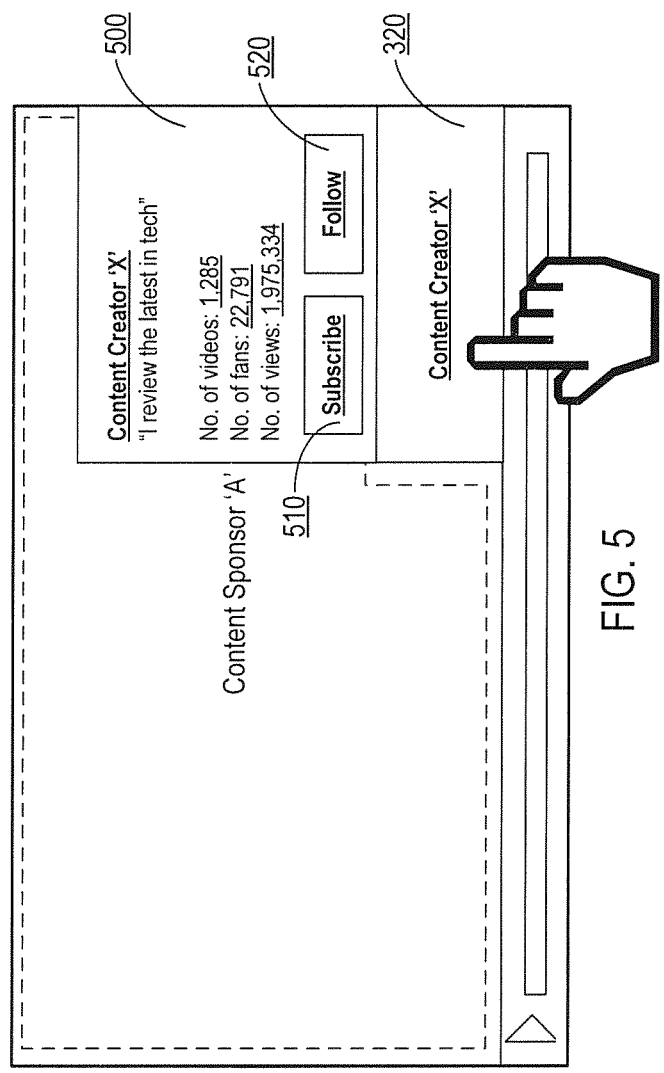
FIG. 5 depicts an exemplary media player interface within which a media content item is provided, in accordance with one implementation of the present disclosure.

At block 270, information pertaining to the content creator and/or the content sponsor can be provided. In certain implementations, such information can be provided to the content viewer (e.g., the content viewer that provided the selection received at block 260). Moreover, in certain implementations, such information can be provided in response to a selection (e.g., by the content viewer) of the first control or the second control. By way of illustration, FIG. 5 depicts an exemplary scenario in which control 320 (such as is depicted in FIG. 3A) is selected (e.g., by a content viewer via a content viewer device 102). In such a scenario, upon receiving such a selection, a notification 500 can be generated and/or provided to the content viewer, which can include additional information regarding the content creator (e.g., pertaining to other media content items provided by the content creator). Additionally, in certain implementations, such a notification 500 can include one or more selectable controls, such as a subscription control 510 (which can, for example, generate a subscription for the content viewer with respect to additional content provided by the content creator) and/or a third-party platform (e.g., a social networking site/service) control 520 (which can, for example, generate a subscription for the content viewer with respect to additional content provided by the content creator), such as are described with respect to blocks 280 and 290. In one aspect, block 270 is performed by sponsored media engine 130.

Figure 6A:
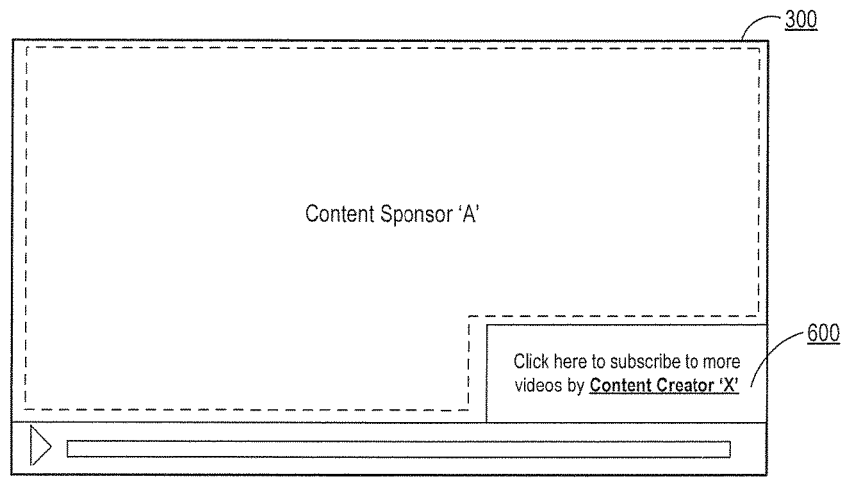
FIG. 6A depicts an exemplary media player interface within which a media content item is provided, in accordance with one implementation of the present disclosure.

At block 280, a subscription can be generated. In certain implementations, such a subscription can be generated in relation to the content viewer (e.g., the content viewer that provided the selection received at block 260). Moreover, in certain implementations such a subscription can be generated with respect to media content items (e.g., other media content items) generated by the content creator (e.g., the content creator that generated the media content item received at block 210). By way of illustration, FIG. 6A depicts an exemplary media player interface 300 within which a media content item 141 (e.g., a media content item created by 'Content Creator 'X'' and sponsored by 'Content Sponsor 'A'') is provided (e.g., to a content viewer), such as in a manner substantially comparable to that depicted in FIG. 3A and described herein. In such a scenario, a control 600 associated with the content creator is provided ("Click here to subscribe . . . ") which indicates that, upon selection, the content viewer can initiate a subscription to additional media content item created/provided by the content creator.

Accordingly, upon receiving a selection of such a control, a subscription to additional media content items generated/provided by the content creator can be generated with respect to the content viewer. In one aspect, block 280 is performed by sponsored media engine 130.

Figure 6B:
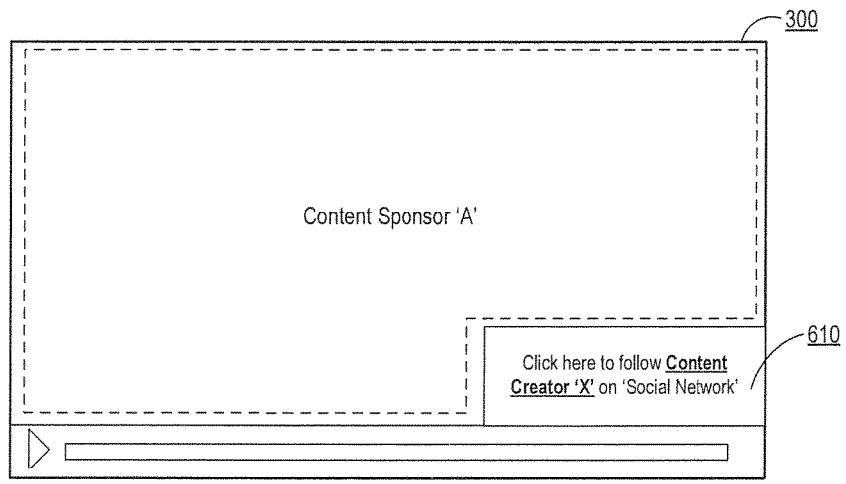
FIG. 6B depicts an exemplary media player interface within which a media content item is provided, in accordance with one implementation of the present disclosure.

At block 290, one or more operation(s) can be initiated. In certain implementations, such operation(s) can be initiated in relation to a third party platform (e.g., a social networking platform). Moreover, in certain implementations operation(s) can be initiated with respect to a content creator (e.g., the content creator that generated the media content item received at block 210). By way of illustration, FIG. 6B depicts an exemplary media player interface 300 within which a media content item 141 (e.g., a media content item created by 'Content Creator 'X'' and sponsored by 'Content Sponsor 'A'') is provided (e.g., to a content viewer), such as in a manner substantially comparable to that depicted in FIG. 3A and described herein. In such a scenario, a control 610 associated with the content creator is provided ("Click here to follow . . . ") which indicates that, upon selection, one or more operations can be initiated (e.g., on behalf of/with respect to the content viewer) in relation to a social networking site/service (e.g., following, sharing, indicating approval/disapproval of, etc., within one or more social networks), such as with respect to the content creator. Accordingly, upon receiving a selection of such a control, one or more of such operation(s) can be initiated with respect to a third party platform. In one aspect, block 290 is performed by sponsored media engine 130.

Figure 7:
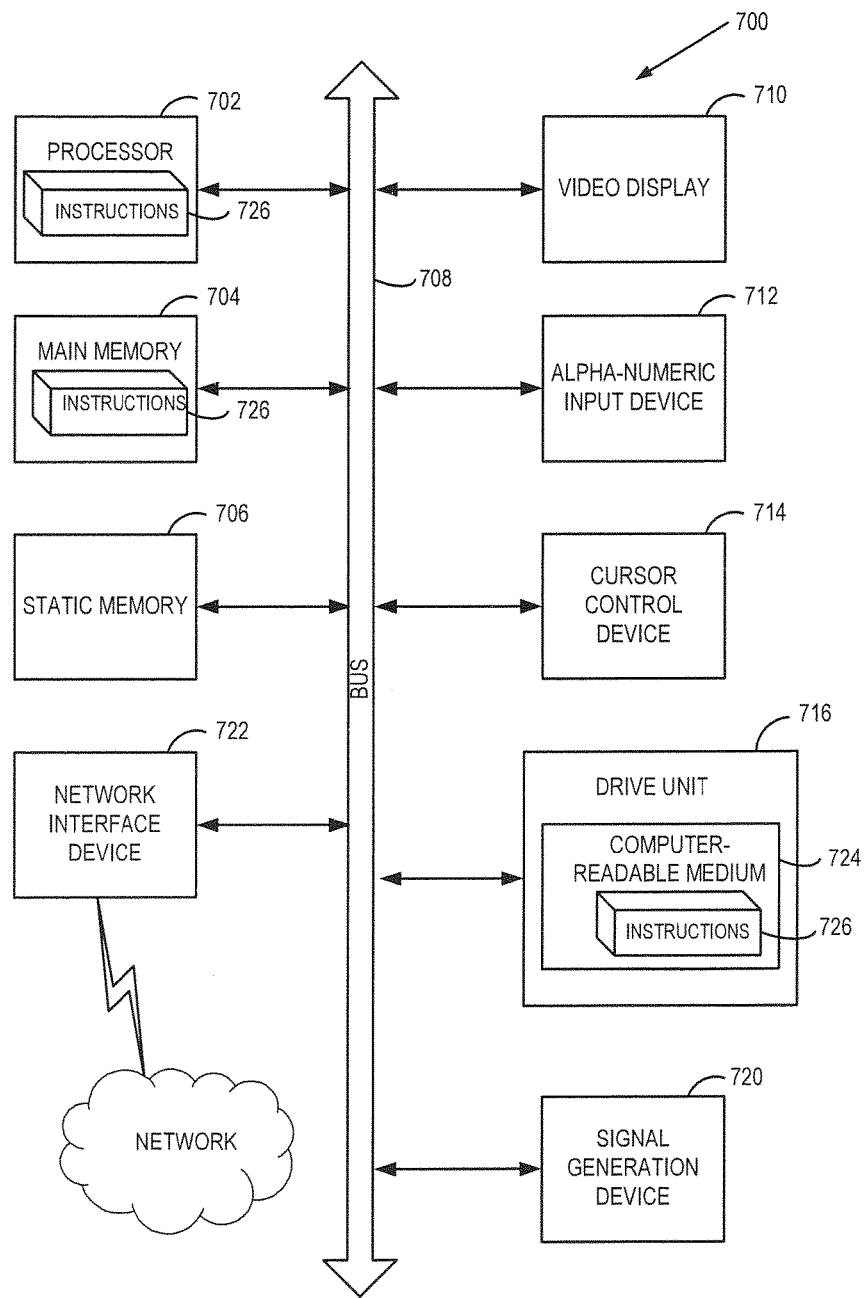
FIG. 7 depicts a block diagram of an illustrative computer system operating in accordance with aspects and implementations of the present disclosure.

FIG. 7 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable medium 724 on which is stored one or more sets of instructions 726 (e.g., instructions executed by server machine 120, etc.) embodying any one or more of the methodologies or functions described herein. Instructions 726 may also reside, completely or at least partially, within the main memory 704 and/or within the processor 702 during execution thereof by the computer system 700, the main memory 704 and the processor 702 also constituting computer-readable media. Instructions 726 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A computer-implemented method for providing selectable controls to be presented with a media content item, the method comprising:
receiving the media content item recorded by a first user of a plurality of users of a content sharing platform, wherein the media content item reflects a positive review of a product of a second user of the plurality of users of the content sharing platform by the first user, wherein the second user is a sponsor of the product, and wherein the first user is not a sponsor of the product;
providing the media content item of the first user for presentation to the second user;
receiving a selection of the media content item of the first user by the second user, the selection of the media content item of the first user indicating a request of the second user to sponsor a presentation of the media content item of the first user to the plurality of users of the content sharing platform to promote the product of the second user, the media content item of the first user to be displayed together with information promoting additional content items of the first user to other users of the plurality of users, in order to reward the first user for recording the media content item that reflects the positive review of the product;
creating, by a processing device, a media player interface comprising the media content item of the first user to promote the product of the second user, and a first control selectable to subscribe to the additional media content items of the first user or to view information about the additional media content items of the first user, the media player interface further comprising a second control associated with the second user; and
providing the media player interface to be displayed to a third user, the third user being one of the other users of the plurality of users of the content sharing platform.

2. The method of claim 1, further comprising:
receiving a selection of the first control via the media player interface; and
providing to the third user the information promoting the additional media content items of the first user.

3. The method of claim 1, wherein the first control comprises a subscription control and wherein the method further comprises receiving a selection of the subscription control, and generating, in relation to the third user, a subscription with respect to the additional media content items of the first user.

4. The method of claim 1, wherein the first control comprises a third-party platform control and wherein the method further comprises receiving a selection of the third-party platform control, and initiating, in relation to a third party platform, an operation with respect to the first user.

5. The method of claim 1, wherein a relative prominence of the first control in the media player interface is increased based on a selection received from the first user to receive relatively less compensation from the second user in return to providing the media content item.

6. The method of claim 1, wherein a relative prominence of the first control in the media player interface is decreased based on a selection received from the first user to receive relatively more compensation from the second user in return to providing the media content item.

7. The method of claim 1, wherein the first user is a content creator of the media content item, and the third user is a viewer of the media player interface comprising the media content item.

8. The method of claim 1, wherein a relative prominence of the first control as overlaid on the media player interface is increased in relation to the media player interface to increase exposure for the first user.

9. The method of claim 8, wherein the relative prominence of the first control is increased based on a selection received from the second user to decrease, in relation to the media player interface, a relative prominence of the second control as overlaid on the media player interface, the second control being associated with the second user.

10. A system for providing selectable controls to be presented with a media content item, the system comprising:
a memory; and
a processing device, coupled to the memory, to:
receive the media content item recorded by a first user of a plurality of users of a content sharing platform, wherein the media content item reflects a positive review of a product of a second user of the plurality of users of the content sharing platform by the first user, wherein the second user is a sponsor of the product, and wherein the first user is not a sponsor of the product;
provide the media content item of the first user for presentation to the second user;
receive a selection of the media content item of the first user by the second user, the selection of the media content item of the first user indicating a request of the second user to sponsor a presentation of the media content item of the first user to the plurality of users of the content sharing platform to promote the product of the second user, the media content item of the first user to be displayed together with information promoting additional content items of the first user to other users of the plurality of users, in order to reward the first user for recording the media content item that reflects the positive review of the product;

create a media player interface comprising the media content item of the first user to promote the product of the second user, and a first control selectable to subscribe to the additional media content items of the first user or to view information about the additional media content items of the first user, the media player interface further comprising a second control associated with the second user; and provide the media player interface to be displayed to a third user, the third user being one of the other users of the plurality of users of the content sharing platform.

11. The system of claim 10, wherein the first control comprises a subscription control and wherein the processing device is further to receive a selection of the subscription control, and generate, in relation to the third user, a subscription with respect to the additional media content items of the first user.

12. The system of claim 10, wherein the first control comprises a third-party platform control and wherein the processing device is further to receive a selection of the third-party platform control, and initiate, in relation to a third party platform, an operation with respect to the first user.

13. The system of claim 10, wherein a relative prominence of the first control in the media player interface is increased based on a selection received from the first user to receive relatively less compensation from the second user in return to providing the media content item.

14. The system of claim 10, wherein a relative prominence of the first control in the media player interface is decreased based on a selection received from the first user to receive relatively more compensation from the second user in return to providing the media content item.

15. The system of claim 10, wherein the first user is a content creator of the media content item, and the third user is a viewer of the media player interface comprising the media content item.

16. The system of claim 10, wherein a relative prominence of the first control as overlaid on the media player interface is increased in relation to the media player interface to increase exposure for the first user.

17. The system of claim 16, wherein the relative prominence of the first control is increased based on a selection received from the second user to decrease, in relation to the media player interface, a relative prominence of the second control as overlaid on the media player interface, the second control being associated with the second user.

18. A non-transitory computer readable medium having instructions stored thereon that, when executed by a processing device, cause the processing device to perform operations for providing selectable controls to be presented with a media content item, the operations comprising:

receiving the media content item recorded by a first user of a plurality of users of a content sharing platform, wherein the media content item reflects a positive review of a product of a second user of the plurality of users of the content sharing platform by the first user, wherein the second user is a sponsor of the product, and wherein the first user is not a sponsor of the product;

providing the media content item of the first user for presentation to the second user;

receiving a selection of the media content item of the first user by the second user, the selection of the media content item of the first user indicating a request of the second user to sponsor a presentation of the media content item of the first user to the plurality of users of the content sharing platform to promote the product of the second user, the media content item of the first user to be displayed together with information promoting additional content items of the first user to other users of the plurality of users, in order to reward the first user for recording the media content item that reflects the positive review of the product;

creating a media player interface comprising the media content item of the first user to promote the product of the second user, and a first control selectable to subscribe to the additional media content items of the first user or to view information about the additional media content items of the first user, the media player interface further comprising a second control associated with the second user; and providing the media player interface to be displayed to a third user, the third user being one of the other users of the plurality of users of the content sharing platform.

19. The non-transitory computer readable medium of claim 18, wherein the first control comprises a subscription control and wherein the operations further comprise receiving a selection of the subscription control, and generating, in relation to the third user, a subscription with respect to the additional media content items of the first user.

20. The non-transitory computer readable medium of claim 18, wherein the first control comprises a third-party platform control and wherein the operations further comprise receiving a selection of the third-party platform control, and initiating, in relation to a third party platform, an operation with respect to the first user.

21. The non-transitory computer readable medium of claim 18, wherein a relative prominence of the first control as overlaid on the media player interface is increased in relation to the media player interface to increase exposure for the first user.

22. The non-transitory computer readable medium of claim 21, wherein the relative prominence of the first control is increased based on a selection received from the second user to decrease, in relation to the media player interface, a relative prominence of the second control as overlaid on the media player interface, the second control being associated with the second user.

* * * * *